Feb. 18, 1947.   J. ALBERTOLI   2,416,039
CAN FILLING APPARATUS
Filed Sept. 28, 1942   2 Sheets-Sheet 1
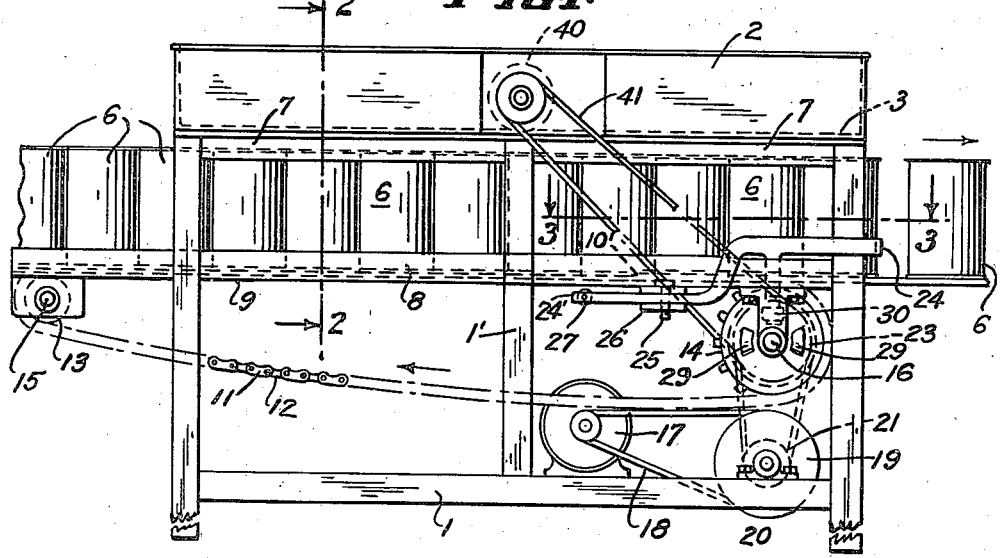
INVENTOR.
JOHN ALBERTOLI
BY
ATTORNEY.

Feb. 18, 1947.    J. ALBERTOLI    2,416,039
CAN FILLING APPARATUS
Filed Sept. 28, 1942    2 Sheets-Sheet 2
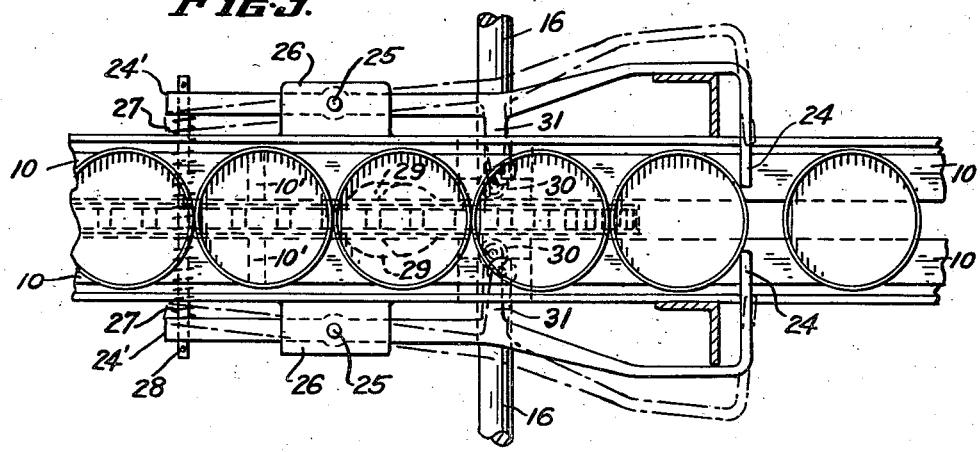
INVENTOR.
JOHN ALBERTOLI
BY
ATTORNEY.

Patented Feb. 18, 1947

2,416,039

UNITED STATES PATENT OFFICE 2,416,039

CAN FILLING APPARATUS

John Albertoli, San Francisco, Calif.

Application September 28, 1942, Serial No. 459,890

7 Claims. (Cl. 226—72)

This invention relates to can filling apparatus for canneries or mechanisms for passing empty cans in a row along and under a supply pan or table from which fruit or other food materials is placed into the cans and the filled cans are passed out for sealing and processing.

The invention has for its principal object improvements in such apparatus whereby the conveying of the cans and simultaneous jiggling or jogging of the cans to settle their contents, is more simply and effectively carried out. Other features and advantages of the invention will appear in the following description and accompanying drawings.

In the drawings:

Fig. 1 is a side elevation of an apparatus made in accordance with the invention.

Fig. 2 is a cross section of Fig. 1 as seen from the line 2—2 thereof.

Fig. 3 is a plan sectional view of a portion of Fig. 1 as seen from the line 3—3 thereof.

Fig. 4 is a plan view of the central portion of the fruit holding pan of Fig. 1 showing the slot in its bottom through which the fruit falls into the cans.

Before describing the drawings in detail, it may be explained that in such apparatus, sometimes termed a "can filling table" a row of cans passes slowly intermittently along a fruit (or other commodity) supply pan from which girls drag the fruit into the cans, and see that each can is properly filled, putting in or taking out a piece as may be required, before the cans pass out of reach, while to insure the fruit, or other material being settled into the cans, means is provided for vibrating the cans vertically or rapidly jiggling them after the fruit is in them.

In building various arrangements for carrying out the above requirements I have discovered that if the row of open top cans is supported wholly on one or more strands of chains running along the bottom of the guides along which the cans travel and means is provided to retard the cans, and the chain or chains are run faster than the cans, the successive links of the chains will strike the beads at the lower edges of the cans and vibrate or jiggle them vertically with a succession of quick shocks which quickly settle the fruit or other contents, while at the same time the moving chain may be a conveyor which carries the cans along and through the retarding means so that the actual travel of the cans may be as slow as desired—all depending on the effectiveness of the retarding means applied to the cans.

The effective jiggling of the cans will depend on the size and type of chain link comprising the chain and its speed of travel. Several modifications of the invention are shown.

In the drawings 1 is the frame of the apparatus, 2 is a fruit supply pan, or rather the side walls of the pan, 3 the bottom, 4 a pair of sheet metal strips at the bottom of the pan forming an elongated slot 5 for substantially the length of the pan 2 and in overhanging relation to a row of cans 6, which travel along under the slot. The length of the slot 5 with the cans below it is shown in Fig. 4 and wherein the brush is omitted.

The cans are guided in single file formation by suitable upper 7 and lower 8 guides or bars, tied together as by vertical members 1' of the frame, and by a bottom strip or plate 9 upon which rides a carrier chain 11—12 positioned and guided between the confronting spaced edges of filler guide strips 10 which are secured to guide bars 8.

The chain 11—12 is here shown as a block chain such as #102 or #103 Diamond drive chain, in which one side is substantially flat except that the side links 11 are slightly higher than the block links 12 so that as the chain is run along the guides faster than the cans the higher side links will successively strike the lower corners of the cans and cause them to vibrate or jiggle with considerable force. In standard chains of this type the opposite side is not flat but both block links and side links are formed with upwardly arched edges as indicated in Fig. 1 (to pass better over a sprocket) and if that side is turned up to support the cans its successive nodulated links would cause a much more violent jiggling of the cans as they pass under their lower edges, but the smoother side gives sufficient jiggling and likewise keeps the wear down, tho a chain with both sides substantially flat except that either the side links or blocks project slightly would be better as both sides would then be more resistant to wear, or a much wider chain such as the Diamond #103 Double could be used or two strands of chain if desired, to get longer life. The above suggestion as to the various chains is not to be considered limiting, as many chains of other make as well as roller chains may be used for the purpose above outlined.

The chain is in the form of an endless loop carried on sprockets 13, 14 mounted on axles 15, 16 as indicated in Fig. 1 and travels in direction of the arrows through any suitable transmission but here indicated as from an electric motor 17 mounted on the frame and belted at 18 to a large pulley 19 supported on a shaft 20 which carries a smaller pulley or sprocket 21 belted or chain connected to a larger pulley or sprocket 23 carried by shaft 16, all proportioned to yield a speed to the chain in excess of the desired speed of the cans along the filling position of the apparatus, when the motor is energized through closing of a suitable safety switch (not shown).

With the construction thus far described, cans fed to the receiving end (left of Fig. 1) of the guides 8 would travel along at substantially the speed of the chain and be ejected at the right-hand end of the guide. However, to prevent this the bottom filler strips 10 which for the greater part of the length of travel of the chain is of lesser height than the chain so that the cans will rest firmly upon the chains, are thickened or raised up from the point 10' and beyond to the end of the machine (or the chain supporting plate 9 is correspondingly lowered) so that the chain driving (and jiggling) of the cans will cease at this point and the filled cans from this point onward will stand firmly on strips 10 so as to be forcibly pushed along by the oncoming cans still on the moving chain, but owing to the weight and consequent frictional effort required to move these few cans as compared to the relatively small driving contact of the moving chain, the chain will slip under all of the cans upon it with a result that they will all travel very slowly, just how slowly depends on the speed of the chain and the number and weight of the filled cans beyond the driving effect of the chain permitted to "brake" their oncoming movement.

However to definitely time the movement of the cans along the guide while permitting the combined conveyor and jiggler chain to pass rapidly beneath the cans I provide a pair of frictional clamping jaws 24 which automatically come together at regular intervals into the path of the cans to stop their forward movement and then swing out to successively release one can at a time at predetermined time intervals. Clamping arms 24 are vertically pivoted at 25 to brackets 26 secured to the frame 1 of the apparatus and are normally urged toward clamping position as by a compression coiled spring 27 supported on a rod 28 and reacting between the shanks 24' of the clamping arms 24, and the arms are periodically spread to release a can by the action of a pair of face cams 29 secured to opposite sides of sprocket wheel 14 and which operate against cam rollers 30 carried on inwardly extending lugs 31 of each arm 24. By this means, if spring 27 is sufficiently strong the driving effect of the chain will not be able to open the clamping arms 24, and the discharge of the filled cans will be intermittently timed, as the arms will spring back to clamp the next can the moment one is released.

When the frictional clamping arms are used instead of relying on the dead load of a few filled cans beyond the reach of the chain, raised strips 10' need not be used unless it is desired to stop the jiggling of the cans at this point. It may also be mentioned that guides 8 may be extended to the right any desired distance to increase the dead loaded cans beyond the conveyor chain to any extent required, all depending on the size and weight of the cans and other factors above mentioned.

Fresh cans may be fed to the receiving end of the conveyor guides by any desired means; not involved in the invention; but should be fed rapidly enough so that the speed of the chain will keep the row full with all cans in touching relation so that the fruit will not fall between them while they are being filled, after the cans are discharged they may pass to any type of power or gravity conveyor (not shown) for carrying to the further cannery processing steps.

A feature of the apparatus of considerable importance is that either one or both of the bottom strips 4 which form the slot 5 are adjustable toward and from one another (as by slots and bolts 32) to adjust the width of the slot to a size determined by the fruit or sizes of the pieces being filled, so that automatically each can will only have the correct amount in it when the surplus in the pan 3 is scrapped away either by hand or stick or a fixed scraper, or a revolving brush 40 extending across the slot, and driven by belt or chain 41 is indicated. The clearance from the top of the cans to the bottom of the pan is made only sufficient to permit the free jiggling of the cans slightly as described.

While I show and prefer a chain or chains for the carrier strand, still a smooth flexible band or belt with cleats or ridges across it would be the broad equivalent, tho the chains being standard and made with hardened blocks or rollers stand the wear much better and also give a more pronounced vibrating shock, but my use of the word "chain" in the claims is intended to broadly include such equivalents. Also, my use of the word "pan" to designate the tray or surface upon which the fruit is supported for dragging or scraping across into the slot, is intended to cover such a fruit supporting surface or table even if it has little or no marginal walls, as the walls only aid in preventing pieces of fruit from slipping off while being manually dragged across the surface to the slot by the operator girls.

I therefore claim:

1. In a can filling apparatus, guide means for guiding a row of standing cans for filling, a chain extending along the guide means and upon which the cans stand while being filled, and means for moving said chain relative to the cans for jiggling the cans to settle their contents and also carry said cans bodily along said guide means, said guide means with the row of cans thereon extending forward in direction of travel beyond the point of conveying contact with said chain to provide some filled cans on the extended portion of the guide means to act as a brake to retard the travel of the cans below the speed of the chain.

2. In a can filling apparatus, a guide for guiding a row of standing cans for filling, a chain extending along the guide and wholly upon which the cans stand, means for moving said chain along the guide to bodily carry the cans along, and means at the forward end of the row of cans retarding the cans below the speed of the chain, the links of said chain formed to successively engage the cans and jiggle the cans as the chain passes under them.

3. In a can filling apparatus, a guide for guiding a row of standing cans for filling, an endless loop of chain passing over sprockets at opposite ends of the loop and with one run of the chain extending along said guide with the cans standing thereon, means for driving one of said sprockets to drive the chain to carry said cans along, and movable means operated in synchronism with said chain for intermittently opposing the travel of said cans so that the chain will continue its motion to pass under the cans, the links of said chain formed to successively engage the lower edges of the cans and jiggle them as it moves under them.

4. In a can filling apparatus, a guide for guiding a row of standing cans for filling, an endless loop of chain passing over sprockets at opposite ends of the loop and with one run of the chain extending along said guide with the cans standing thereon, means for driving one of said sprockets to drive the chain to carry said cans along, and laterally movable means operated in synchronism with the following chain arranged to intermittently move between cans in the forward end of the row to stop and release the travel of said cans so that the chain will continue its motion to pass under the cans, the links of said chain formed to successively engage the lower edges of the cans and jiggle them as it moves under them.

5. In a can filling apparatus, a guide arranged for guiding a row of standing cans for filling, a supply pan extending along and above the row of cans adapted to hold a supply of fruit or other product to be canned and provided with flat relatively thin bottom plates spaced to form a fruit feeding slot of lesser width than the cans directly over the row of cans and relatively close thereto, means for advancing the cans in touching relation along said row, and a revolving brush positioned across said slot arranged to brush away surplus fruit not falling therethrough into the cans, and means for revolving said brush.

6. In an apparatus to facilitate the manual filling of cans, a guide arranged for guiding a row of standing cans for filling, a supply pan extending along and above the row of cans adapted to hold a supply of fruit or other product to be canned and provided with flat relatively thin bottom plates spaced to form a fruit feeding slot of lesser width than the cans directly over the row of cans and relatively close thereto, conveyor means upon which the cans rest for advancing the cans along the row and said feeding slot, and means interfering with free progress of the cans at the advanced end of said row to insure the conveyor urging all oncoming cans into contact in said row, to thereby prevent objects to be canned from falling through the slot between the cans.

7. In an apparatus to facilitate the manual filling of cans, a guide arranged for guiding a row of standing cans for filling, a supply pan extending along and above the row of cans adapted to hold a supply of fruit or other product to be canned and provided with flat relatively thin bottom plates spaced to form a fruit feeding slot of lesser width than the cans directly over the row of cans and relatively close thereto, conveyor means upon which the cans rest for advancing the cans along the row and said feeding slot, and intermittently operated means periodically stopping the cans at the advanced end of said row to insure the conveyor urging all oncoming cans into contact in said row.

JOHN ALBERTOLI.

REFERENCES CITED

The following references are of record in the file of this patent:

UNITED STATES PATENTS

| Number | Name | Date |
| --- | --- | --- |
| 1,031,253 | Duncan | July 2, 1921 |
| 1,187,143 | Hanel | June 13, 1916 |
| 1,436,295 | Shumaker | Nov. 21, 1922 |
| 1,519,153 | Mitton | Dec. 16, 1924 |
| 652,820 | Tuttle | July 3, 1900 |
| 1,268,739 | Longrod | June 4, 1918 |
| 1,887,751 | Colver | Nov. 15, 1932 |
| 2,029,054 | Burge | Jan. 28, 1936 |
| 2,062,428 | Rapp | Dec. 1, 1936 |
| 2,058,976 | Gray | Oct. 27, 1936 |
| 2,026,118 | Bamby | Dec. 31, 1935 |
| 741,792 | Hodges | Oct. 20, 1903 |
| 1,959,937 | Thatcher | May 22, 1934 |